(12) United States Patent  
Morita (10) Patent No.: US 6,403,052 B1  
(45) Date of Patent: Jun. 11, 2002

(54) METHOD FOR GENERATION OF ACTIVE OXYGEN IN AN OXYGEN-CONTAINING GAS PHASE

(75) Inventor: Ken-ichi Morita, 3-12-5 Kataseyama, Fujisawa, Kanagawa (JP)

(73) Assignee: Ken-ichi Morita, Kanagawa (JP)

( * ) Notice: Subject to any disclaimer, the term of this patent is extended or adjusted under 35 U.S.C. 154(b) by 0 days.

(21) Appl. No.: 09/594,891

(22) Filed: Jun. 14, 2000

(51) Int. Cl.[7] .............................................. C01B 13/00
(52) U.S. Cl. ...................................... 423/579; 204/252
(58) Field of Search .............................. 423/579, 581; 204/252

(56) References Cited

U.S. PATENT DOCUMENTS 5,741,887 A * 4/1998 Morita et al. ................ 528/422

OTHER PUBLICATIONS

"Generation Of Superoxide By The Addition Of Polyaniline To Water", Shigeru Otsuka, Ken–ichi Morita and Norimichi Kawashima, *Zairyo Gijutsu (Journal Of Material Science)*, vol. 15, No. 5, 1997, pp. 27–32.

"Generation Of Superoxide By Adding Polyaniline To Water", Shigeru Otsuka, Kiyoshi Saito and Ken–ichi Morita, *Chemistry letters 1996*, pp. 615–616.

"Superoxide Generator Using Polyaniline Catalyst", Norimichi Kawashima, Masamichi Takamatsu, Ken–ichi Morita, *Colloids and Surfaces B: Biointerfaces*, vol. 11 (1998), pp. 297–299.

* cited by examiner

*Primary Examiner*—Steven P. Griffin  
*Assistant Examiner*—Maribel Medina  
(74) *Attorney, Agent, or Firm*—Beyer Weaver & Thomas, LLP

(57) ABSTRACT

Agents containing polyaniline or derivative of polyaniline of one or more specified kinds shown by Formulas (1)–(4) given below can generate active oxygen when contacted with an oxygen-containing gas:

Formula (1)

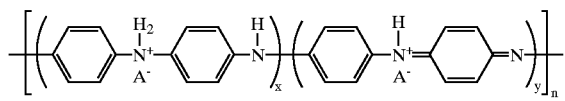

Formula (2)

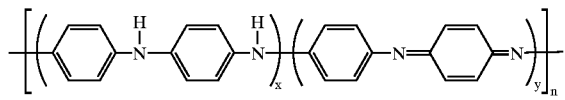

Formula (3)

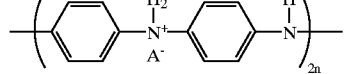

Formula (4)

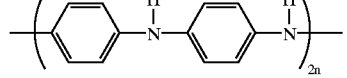

where A is a negative ion, x and y are positive numbers such that $x+y=1$ and n is a positive integer between 2 and 1000.

11 Claims, 5 Drawing Sheets

METHOD FOR GENERATION OF ACTIVE OXYGEN IN AN OXYGEN-CONTAINING GAS PHASE

BACKGROUND OF THE INVENTION

This invention relates to a method of generating active oxygen in a gas phase and more particularly to a method of generating active oxygen in an oxygen-containing gas phase by using an agent containing polyaniline.

New sterilization and deodorizing methods by using active oxygen are coming to be known because they do not require any equipment of a particular type and are highly effective. Known methods of generating active oxygen include the use of a photocatalyst such as titanium oxide and irradiation of ozone by a beam of ultraviolet light. These prior art methods of generation, however, have a basic disadvantage that they require light.

SUMMARY OF THE INVENTION

It is therefore an object of this invention, in view of the above, to provide a new method of easily generating a sufficiently large amount of active oxygen for sterilization and decomposition of organic compositions in a gas phase environment even where there is no available light.

An agent to be used in a method embodying this invention, with which the above and other objects can be accomplished, may be characterized as containing polyaniline and wherein active oxygen is generated by reacting this polyaniline with the oxygen contained in the gas phase.

According to a preferable method of using such an agent, active oxygen is generated by increasing the amount of water adsorbed to polyaniline so as to activate the oxygen in the gas phase. As water is adsorbed, polyaniline may be believed to supply electrons to the oxygen in the gas phase and active oxygen is generated such that the oxidized structures are increased in the polyaniline. Thus, it is preferable to reduce the polyaniline after active oxygen has been generated such that its ability to generate active oxygen can be restored again. In other words, as polyaniline gives off electrons to oxygen to generate active oxygen, its oxidized structures increase but if its reduced structures increase, its ability to give off electrons to the oxygen in the gas phase can be restored. According to preferred method of the present invention, polyaniline is repeatedly oxidized and reduced such that active oxygen can be generated repeatedly.

A preferable method according to this invention includes the step of reducing the amount of water adsorbed to the polyaniline after active oxygen is generated so as to restore the ability of the polyaniline to provide oxygen in the gas phase with electrons. In summary, polyaniline to be used according to this invention can generate active oxygen repeatedly by increasing and decreasing the amount of water adsorbed thereto. It may be because the reduced structures in polyaniline are increased again as the amount of adsorbed water is reduced.

Throughout herein, "active oxygen" will mean all kinds of oxygen that are far more active than ordinary oxygen and can more easily start a chemical reaction, including singlet oxygen, superoxide anion radical ($.O_2^-$) hydroxy radical ($.OH$), perhydroxy radical ($.OOH$) and hydrogen peroxide ($H_2O_2$).

A device embodying this invention for generating active oxygen is characterized as using an agent as described above and preferably also as comprising means for reducing this agent and for causing an oxygen-containing gas to come into contact with this agent. Conventionally known chemical or electrochemical means may be used as the means for reducing the agent. In other words, a reducing agent may be used or an electric current for this purpose may be passed to increase the reducing structures in polyaniline such that it becomes possible to generate active oxygen again. The amount of water contained by polyaniline may be increased and decreased by alternately passing air with different water contents so as to intermittently cause active oxygen to be generated.

In addition to or instead of a reducing means as described above, the device according to this invention may comprise means for heating and cooling or for continuously heating the agent of this invention. If the agent is heated and cooled repeatedly or is continuously heated, the amount of water adsorbed thereto can be increased and decreased accordingly such that active oxygen can be generated intermittently. The invention does not impose any particular limitations on the kind of such means for heating and cooling or continuously heating the polyaniline. A heater or a cooler of a usual kind such as a Peltier element may be utilized. Neither does the invention impose any particular requirement on the kind of the means for contacting an oxygen-containing gas to polyaniline. A simple fan may be made use of for this purpose. Such a device may be used singly or may be incorporated in another device such as an air cleaner, a humidifier, an air conditioner, a deodorizer or a device for decomposing small amounts of organic substances.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

DETAILED DESCRIPTION OF THE INVENTION

A method embodying this invention may be characterized as using an agent containing one or more kinds of polyaniline shown by Formulas (1)–(4) given below:

Formula (1)

Formula (2)

Formula (3)

Formula (4)

where A represents a negative ion such as the conjugate base of a protonic acid or a Lewis acid, x and y are positive numbers such that x+y=1 and n is a positive integer preferably in the range of 2 to 1000.

It is further preferred that the agent contain, in addition to polyaniline or instead of polyaniline, a polyaniline derivative with a similar ability to generate active oxygen. Examples of such polyaniline derivative includes those obtained by replacing hydrogen atoms of the aromatic rings of polyaniline with groups such as alkyl groups and alkoxyl groups.

According to a method of this invention, active oxygen is generated by causing polyaniline to react with oxygen contained in a gas phase. In using this method, it is preferable to generate active oxygen by increasing the amount of water adsorbed to the polyaniline. It is further preferred in connection with a method of this invention to reduce the polyaniline after active oxygen has been generated so as to restore its ability to generate active oxygen. In summary, it is preferred that the polyaniline be oxidized and reduced repeatedly such that active oxygen is generated repeatedly. Alternatively, it is preferable to reduce the amount of water adsorbed to the polyaniline after active oxygen has been generated so as to restore the ability of polyaniline to generate active oxygen and to both increase and reduce the amount of adsorbing water repeatedly such that active oxygen is generated repeatedly.

In summary, polyaniline to be used according to this invention may be either in oxidized or reduced form. It may have a substitution group such as alkyl group on the aromatic ring, or may be a copolymer. It may be either doped with protonic acid such as sulfuric acid and hydrochloric acid or with Lewis acids, or it may be undoped. There is no limitation as to the degree of polymerization. As explained above, the number n appearing in the chemical formulas may be 2–1000 but more preferably 10–500.

Polyaniline according to this invention can be produced by known conventional methods such as chemical synthesis by using an oxidizing agent to polymerize aniline or an electrochemical method of polymerizing aniline. In such a chemical synthesis, known oxidizing agents such as persulfates and Lewis acid may be used.

Figure 1:
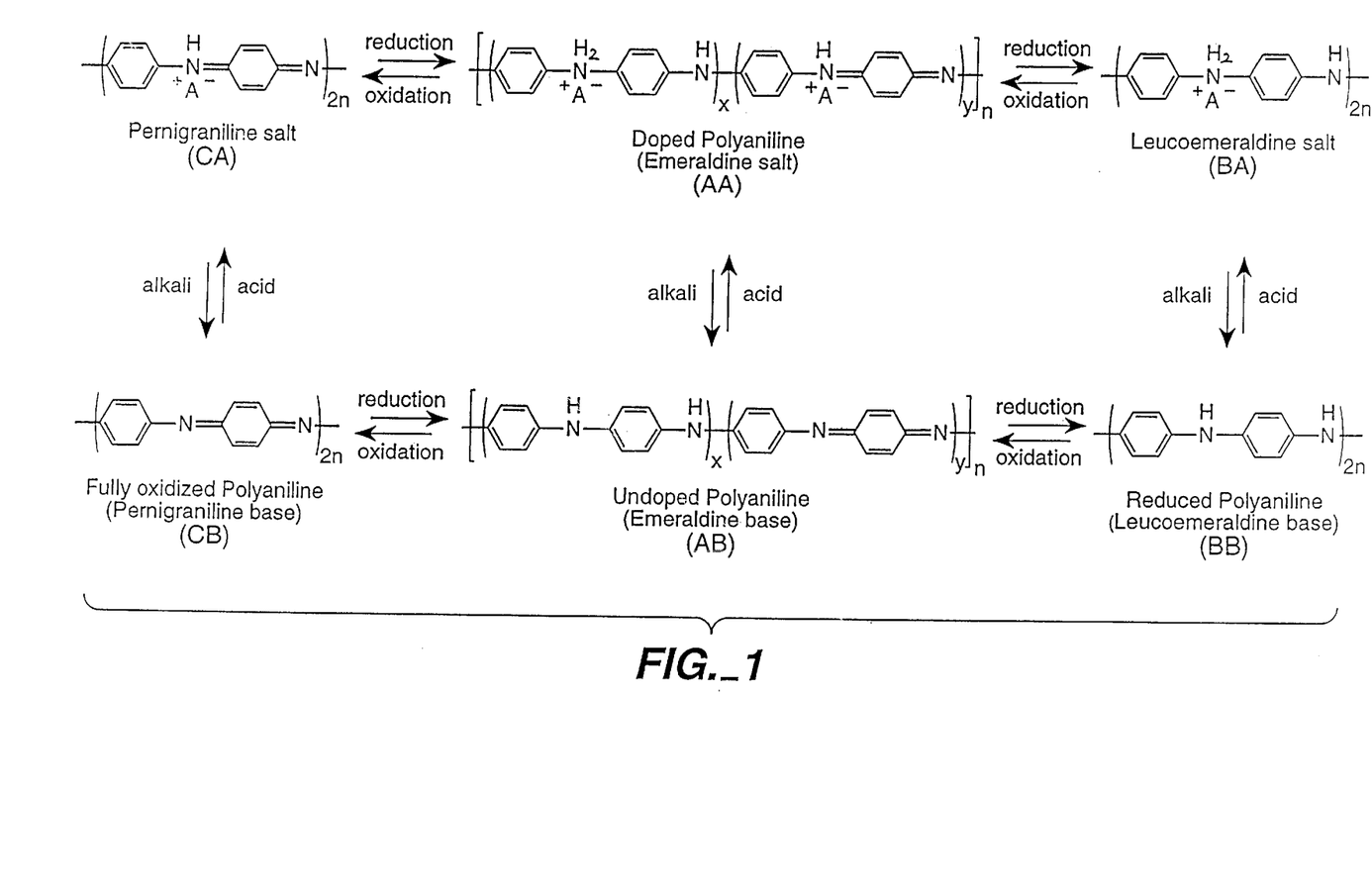
FIG. 1 is a drawing which shows oxidation and reduction of polyaniline.

Preferred examples of polyaniline according to this invention will be explained more in detail next with reference to FIG. 1.

Doped polyaniline (AA) is produced by an ordinary method of chemical synthesis whereby aniline is dissolved in an aqueous acid solution and an oxidizing agent is added thereto for effecting polymerization. Undoped polyaniline (AB) is obtained if this is neutralized with an alkali. These two types of polyaniline AA and AB may be referred to as oxidized polyaniline, in order to distinguish them from reduced polyaniline which will be described below. Aforementioned AB is also referred to as emeraldine, and AA is its salt. These oxidized kinds of polyaniline AA and AB can be reduced easily electrochemically or by the use of a weak reducing agent such as hydrazine, becoming BA or BB as shown in FIG. 1, BB being also referred to as leucoemeraldine and BA being its salt. Normally, what is ordinarily referred to as "polyaniline" is said to contain about 50% each of the oxidized form and the reduced form. Polyaniline in the reduced form is automatically oxidized, if left in air, becoming polyaniline (AA, AB), which does not undergo any change, even if left in air. If they are further oxidized by stronger oxidizing agent, however, pernigraniline (CB) or its salt (CA) is generated. They have shown no activity. In FIG. 1, the number of repetition n is generally 2–5000, and more preferably 10–1000.

The mechanism by which active oxygen is generated in a method according to this invention is not clearly understood but it may be believed that oxygen in a gas phase receives an electron when it comes into contact with polyaniline, for example, to become superoxide. Superoxide is known to quickly become hydroxyl radical.

An agent to be used according to this invention may consist 100% of polyaniline as described above but may also contain an additive such as powders of active charcoal and zeolite, in addition to polyaniline of the types described above. Other examples of such an additive include powders of active carbon and electrically conductive fibers. Moreover, a binder may be added to produce an agent in a form which is convenient for the use, such as in the form of powders, a film or a coating material. Examples of such a binder may include inorganic materials, fluorine-containing resins, carbon resins, epoxy resins and acryl resins which are stable against active oxygen. When such an additive and/or other substances are added, the invention does not impose any particular condition as to its ratio, but it may usually be no less than 1 weight % and less than 100 weight % with respect to the agent as a whole, and preferably in the range of 10–70 weight %. Neither does the invention impose any particular limitation as to the form in which the agent is to be used. The agent may be in the form of powder, film or pellets. One preferred method is to add ions of a transition metal such as iron, copper and manganese or their chelates to the agent by 5–5000 ppm so as to accelerate the Fenton and Haberweiss reactions and to thereby enhance the sterilization effect. The agent to be used according to this invention may be coated on a base material, say, of a metal, resin, glass, wood or fibers or may be carried on a manufactured product.

The invention does not depend upon any particular method of reducing polyaniline. Any appropriate conventional method may be used for this purpose such as a chemical method by using hydrogen gas or a reducing agent such as hydrazine, sulfites and hydrogen sulfites. When hydrogen gas is to be used, this may be done by heating a honeycomb or a filter supporting polyaniline (say, in a granular powder form) on its surface for causing hydrogen gas to come into contact therewith. In order to improve the efficiency, a catalyst may be preliminarily provided, supported by polyaniline. When a reducing agent is to be used, this may be done by dissolving it in a solvent such as water or alcohol and immersing polyaniline in such a solution.

Figure 2A:
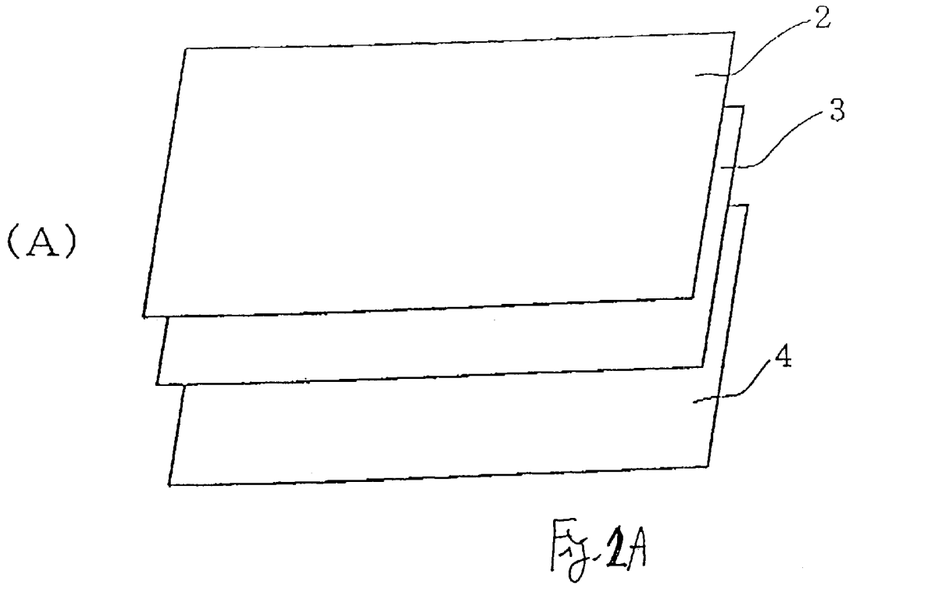
FIG. 2A is a schematic diagonal view of a device embodying this invention for generating active oxygen in a gas phase environment.
Figure 2B:
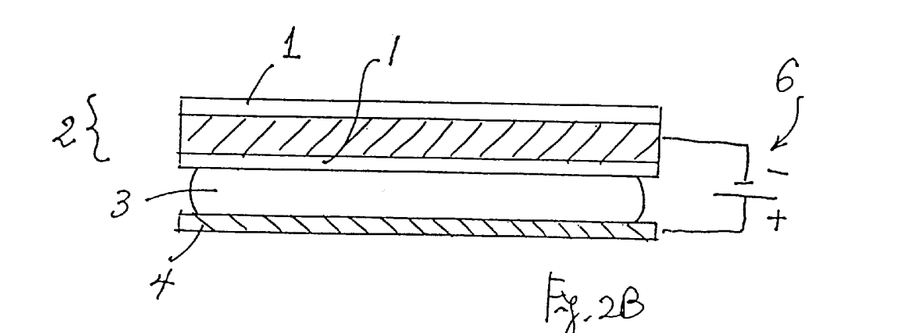
FIG. 2B is a schematic sectional view of the device of FIG. 2A.
Figure 2C:
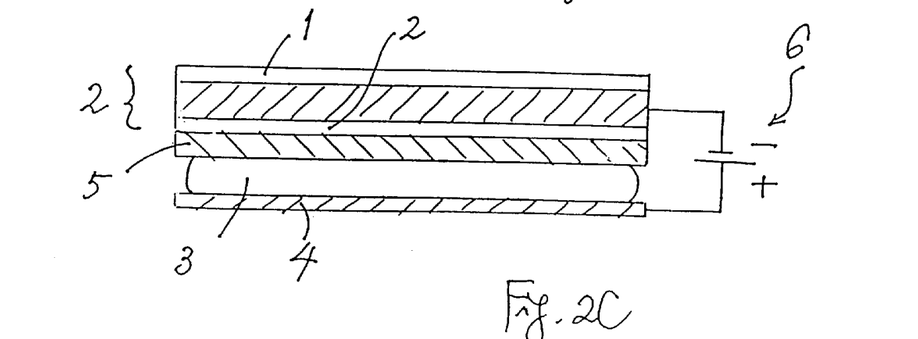
FIG. 2C is a schematic sectional view of another device embodying this invention for generating active oxygen.

The reduction of polyaniline may be effected also by an electrochemical method, say, by applying a voltage from outside to cause a reducing current to pass through by means of a device such as shown in FIGS. 2A and 2B. Numeral 2 indicates a planar negative electrode carrying a polyaniline-containing layer 1 on each of its mutually oppositely facing main surfaces. An ion-conducting partition membrane 3 (such as water) is disposed between the negative electrode 2 and a planar positive electrode 4 disposed parallel to the negative electrode 2. FIG. 2C is another device similar to the one described above with reference to FIGS. 2A and 2B except there is an electrically conductive plate 5 placed between the negative electrode 2 and the partition membrane 3. Active oxygen can be generated continuously if either of such devices is placed in a gas phase containing oxygen and a current is passed therethrough by means of an external voltage source. By this method, the voltage of polyaniline may be maintained at −0.8–0.3V vs SCE, or preferably at −0.5–0V vs SCE. In FIGS. 2B and 2C, numeral 6 indicates such a voltage source such as a power cell.

The aforementioned polyaniline-containing layer 1 may be produced, for example, either by an electrolytic polymerization method or by covering the surface of a base material with a liquid obtained by mixing polyaniline with a solvent such as N-methylpyrolidone or a coating material containing polyaniline powder. Convenient examples of base material include films, paper and cloth materials. The aforementioned coating material may additionally contain polymer electrolytes such as fluorine-containing polymer electrolytes and charcoal ink. In order to improve the electro-conductivity of polyaniline, a highly conductive material such as carbon may be preliminarily mixed in. It is preferable that the polyaniline-containing layer 1 be highly hygroscopic and have the property of attracting bacteria. Examples of materials for the partition membrane 3 include ion-conductive films, as well as paper and cloth materials which have been slightly wetted with water. When use is made of an ion-conductive film, it is preferable to pass a current therethrough intermittently in order to prevent localization of ions.

The invention does not impose any particular limitation on the method of increasing and/or decreasing the amount of water adsorbed to polyaniline. Use may be made of a method of heating and cooling or continuously heating the agent or a method of varying the ambient temperature. If the agent is placed in a column to be dried by heating it or by passing dry air therethrough and a malodorous gas is thereafter passed therethrough, it is possible to deodorize the gas. The agent may also be applied on the surface of walls or pipes by coating, or a piece of cloth, a sheet, a plate or a film covered with the agent may be simply left in a gas phase in order to have active oxygen generated by natural changes in the air temperature and humidity. Active oxygen may be also generated by coating a film with graphite powders, coating the graphite-coated film further with an agent of this invention and passing a current through the layer of graphite intermittently to repeatedly heat and cool it. In such a method, the temperature should be changed, say, in the range of 30–200° C. or more preferably 50–150° C.

The invention does not impose any limitation on the oxygen-containing gas phase in which the method is to be used. This includes the atmospheric air. If oxygen exists in the molecular form, its content may be 5–50%. Neither does the invention impose any limitation on the amount of water component in the gas phase but it may be in the range of 5–100% in relative humidity and the range of 20–100% is particularly preferred. For generating active oxygen efficiently, it is preferable to blow an oxygen-containing gas such as air onto the agent of this invention.

It goes without saying that the agent to be used in the method embodying this invention can be used for sterilization and deodorization of all kinds and the decomposition of even a small amount of components such as sulphur compounds, aldehydes, ethylene gas, toluene gas and environmental hormones. If an agent for the method embodying this invention is applied on the surface of a metallic plate, a tile or a plastic plate, the surface can be kept clean and generation of bad odor can be effectively prevented. If a photocatalyst comprising titanium oxide is mixed together, furthermore, the agent can exhibit its effect without regard to whether there is available light and use can be made even in relatively dark places with insufficient lighting.

The mechanism for such sterilization, deodorization and decomposition may be believed to be due to the generation of very small water drops (less than 1 micrometer) containing active oxygen such as superoxide as humid air comes into contact with an agent of this invention. Such water drops serve to envelop bacteria, malodorous components and water-soluble gases in the air and to carry out sterilization and decomposition. The invention may be expected to further serve to delay putrefaction of foods, to maintain freshness of flowers, to relieve workers of stress and to generally contribute to the human health. Because of their small surface tension, these water drops can easily penetrate into live bodies such as plants. Since superoxides are molecules with negative ions, furthermore, they have the effect of reducing acid into a weak alkali.

Figure 3:
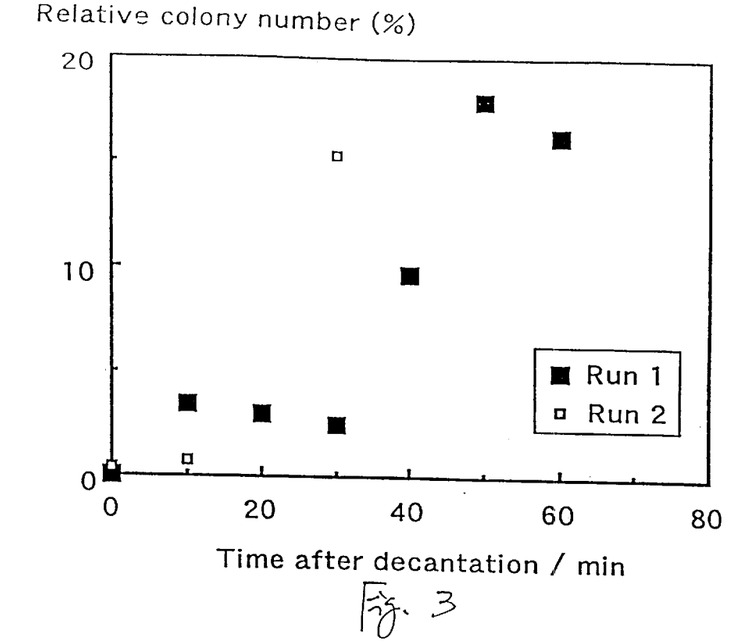
FIG. 3 is a graph showing the result of an experiment for removal of *B-coli* bacteria by a method embodying this invention.

Experiments were carried out by adding 2.5 weight % of polyaniline into pure water with stirring, adding $2.7 \times 10^4$ CFU/ml of *B-coli* bacteria to the water after polyaniline has been removed and to study the effect of sterilization with time. The results of the experiments are shown in FIG. 3. Although the useful lifetime of active oxygen is said to be short, FIG. 3 shows that the sterilization effect remains sufficiently strong for several tens of minutes. It is known that the lifetime can be made longer if the water is kept in a weak alkaline condition.

Experiments

The invention will be explained next with reference to test experiments which have been carried out.

Experiment No. 1

An aqueous solution ($1 \times 10^{-3}$ mol/m$^3$) of hydrochloric acid (or sulfuric acid) 800 ml containing ammonium peroxydisulfate 183.4 g, cooled to 1° C., was added to an aqueous solution ($1 \times 10^{-3}$ mol/m$^3$) of hydrochloric acid (or sulfuric acid) 1200 ml containing aniline 74.4 g, cooled likewise to 1° C., over a period of over 1 hour with stirring in an atmosphere of nitrogen, and the reaction was further continued with stirring at 5° C. for 90 minutes. After the reaction, it was suspended in 1 weight % aqueous solution of sodium carbonate. After it was stirred for 15 hours while its pH was maintained above 8, it was washed with 1 weight % aqueous solution of sodium carbonate and dried to obtain polyaniline (in powder form) with doping rate 0%. This powder was made into the form of pellets by known heating and molding processes.

These polyaniline pellets (each 5 milli-moles) were completely dried by leaving them inside a desiccator containing phosphorus pentoside for a long time. Polyaniline pellets of these two kinds (each 5 milli-moles) were also left in air at humidity 65% to obtain medium dry pellets. Pellets of all these types were left in air with humidity 100% to study the generation of active oxygen by measuring hydrogen peroxide, based on the principle that two molecules of superoxide react to produce one molecule of hydrogen peroxide. Quantitative analysis of hydrogen peroxide was carried out by an electrochemical method by using eight microhole electrodes as described by K. Morita and Y. Shimazu in Anal. Chem., 61, 159 (1989). These completely dried pellets were filled into columns each having an air inlet at one end and an air outlet at the other end, and cigarette smoke and malodorous air from a chicken farm were passed therethrough. It was ascertained that these bad odors disappeared completely.

Experiment No. 2

After the powder of polyaniline produced in Experiment No. 1 (10 millimoles) was left inside an oven at temperature 60° C. for 120 minutes, it was cooled to a room temperature under the condition of humidity 65% and then left within air with humidity 100%. The generation of active oxygen was examined as in Experiment No. 1, and it was ascertained that the amount of generated hydrogen peroxide was about 3 micromoles. A similar result was obtained when the drying was effected by passing wind at a normal temperature instead of inside the oven. These experiments were repeated with a good repeatability. It may thus be concluded that about 6 micromoles of superoxide can be generated by leaving polyaniline dried by an ordinary method in air with humidity 100%.

Experiment No. 3

After polyaniline powder obtained in Experiment No. 1 was mixed with water and a binder and heated for 30 minutes at 120° C., it was made into the form of granular particles. These particles were found to contain polyaniline at about 70%, containing also elements such as Si and Na. The grain size was about 0.7–2 mm.

They were then placed in atmospheres with relative humidity 0%, 56% and 100% to obtain three different kinds of samples with different water contents. Each of these samples were thrown into water to study the generation of active oxygen as described in Experiment No. 1. The results of measurements are shown in FIG. 4.

In addition, another sample obtained by converting polyaniline into reduced polyaniline (see FIG. 1) was left in air with relative humidity of 0% to measure the generation of active oxygen in a similar manner. The results are shown in FIG. 5 wherein circles each indicate a result where reduced polyaniline was used and the line indicates the result where polyaniline was left in an atmosphere with relative humidity 0%.

Figure 4:
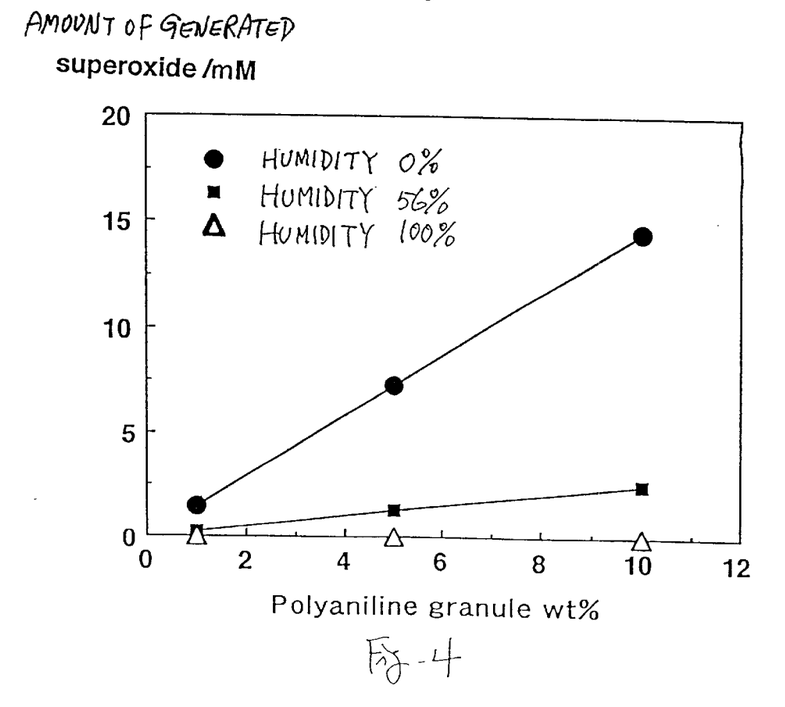
FIG. 4 is a graph showing the result of an experiment for measuring the generation of active oxygen by using polyaniline according to a method embodying this invention.
Figure 5:
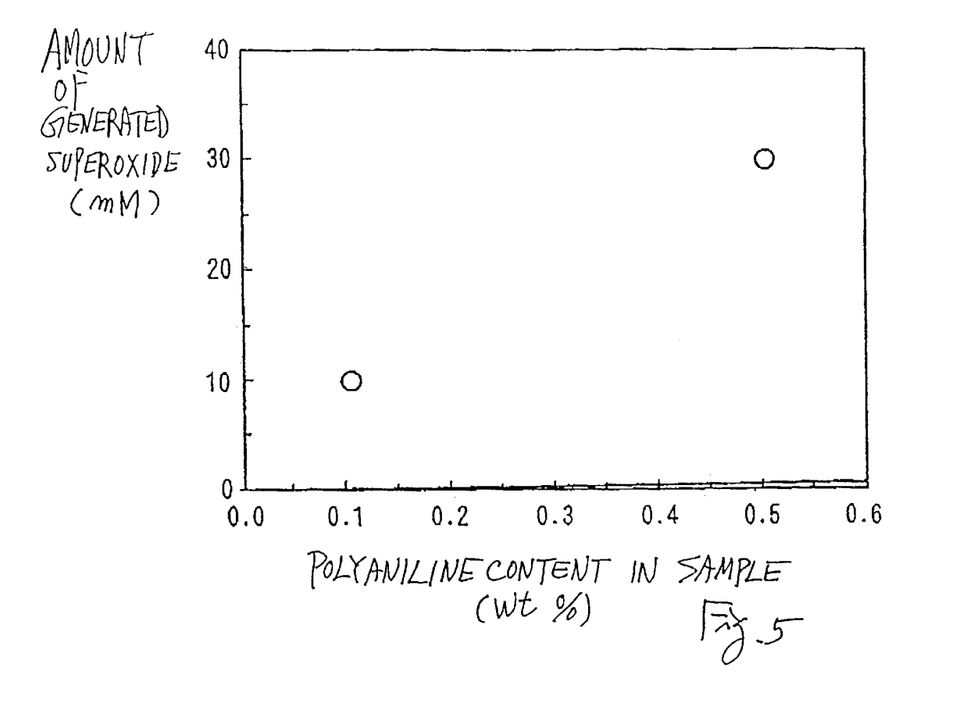
FIG. 5 is a graph showing the result of an experiment for measuring the generation of active oxygen by using reduced polyaniline according to a method embodying this invention.

FIGS. 4 and 5 clearly show that the ability to generate active oxygen improves is the amount of water adsorbed to polyaniline is reduced and that it is further improved if polyaniline is reduced and in a reduced form.

Experiment No. 4

Granular powder 10 g of polyaniline prepared in Experiment No. 3 was placed inside a plastic ball with openings. It was left inside a mildewed closet and a few days later it was ascertained that the closet air was no longer musty.

Experiment No. 5

Polyaniline powder prepared in Experiment No. 1 was dissolved in N-methylpyrolidone and applied over the heat-radiating plate of an air cleaner device. Dry air was intermittently and repeatedly passed through this air cleaner device and it was ascertained that bacteria were successfully prevented from attaching themselves onto the plate surface and generation of bad odor could be limited. In other words, the air-cleaning capability of the air cleaner device has been improved.

Experiment No. 6

Figure 6:
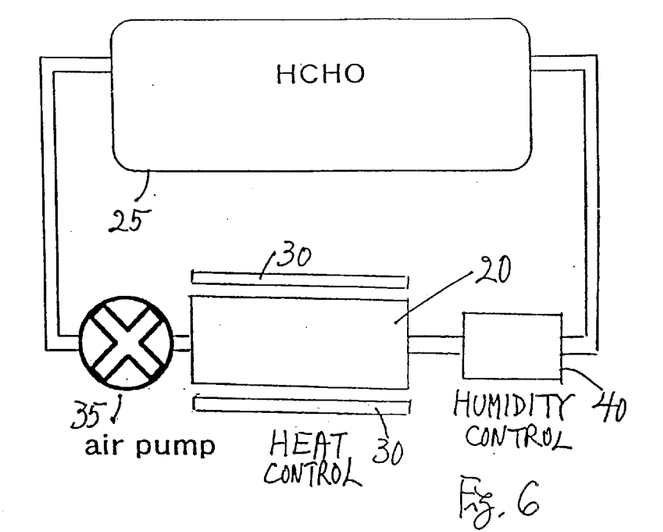
FIG. 6 is a schematic block diagram of a device for generating active oxygen according to another embodiment of this invention.
Figure 7:
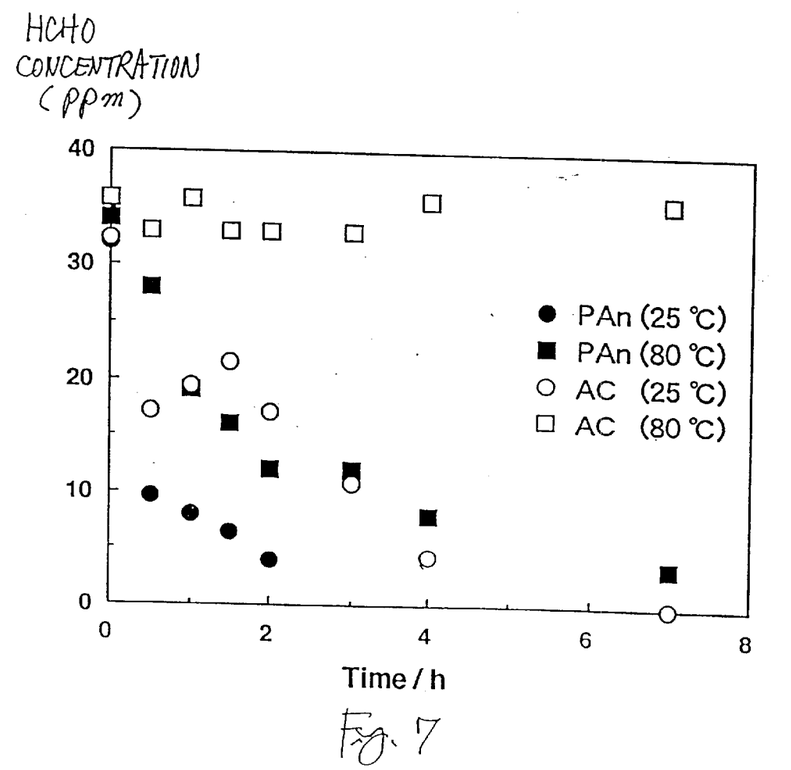
FIG. 7 is a graph showing the effects of active oxygen generated by the device shown in FIG. 6.

As shown in FIG. 6, a column 20 serving as a container and being filled with 5 g of granular powder prepared in Experiment No. 3 by using a silicon-containing inorganic binder was connected through ducts to a room 25 containing air (4 liters) with formaldehyde concentration 40 ppm. The column 20 was heated to 80° C. by means of a heater 30 surrounding it, and the formaldehyde-containing air was circulated through the ducts and the column at a flow speed of 1 liter/min by means of an air pump 35 provided in one of the ducts. A humidity controlling device 40 was also provided in one of the ducts. Three hours later, the formaldehyde concentration in the air was found to have dropped to 5 ppm. As a comparison example, a similar experiment was carried out by using activated carbon instead of polyaniline granule but no significant drop in the formaldehyde concentration was observed. Experiments were further carried out both with activated carbon and polyaniline granule at a room temperature. In this case, the observed drop in the formaldehyde concentration with the use of active charcoal was at about one half of the speed as when polyaniline powder was used, but this is believed to have been due to adsorption. The results of these test and comparison examples, as changes in formaldehyde concentration with time, are shown in FIG. 7 wherein PAn indicates polyaniline and AC indicates activated carbon.

Experiment No. 7

The granular powder prepared in Experiment No. 3, of which the effectiveness has dropped due to an excessive use in Experiment No. 6, was immersed in 500 mL of methanol. After hydrazine monohydrate (ten times the equivalent of polyaniline) was added, it was left overnight for a reduction reaction to take effect. Polyaniline 20 g thus reduced was filled into a column and air containing hydrogen sulfide at 0.5 ppm was passed therethrough for 60 minutes at a flow rate of 1 L/min but no flow of hydrogen sulfide was observed from its outlet. Similar experiments were carried out by using methyl mercaptan and dimethyl sulfide, and similar results could be obtained.

Experiment No. 8

Granular powder was prepared as described in Experiment No. 3 except that the powder contained polyaniline by 57%, carbon by 6% and iron chloride by 1% and the granular diameters were 0.7–2.4 mm. After this granular powder 10 g was heated for 120 minutes at 120° C., it was dried inside a desiccator containing anhydrous phosphoric acid. This dried granular powder was filled into a column and a simple sheet for collecting bacteria was installed at its inlet. Indoor air was passed through this column at a flow rate of 5 L/min for 30 minutes and whatever came to be attached to the sheet in the meantime was incubated on agar according to a known method but no growth of colony was observed. Similar incubation experiment was carried out with indoor air without passing through the column and the number of observed colonies was 15.

Experiment No. 9

A device as shown in FIGS. 2A and 2B was prepared. Next, a coating material containing polyaniline powder with dopant ratio 0% by 10 weight %, epoxy resin (product name of Epicote 1001, produced by Yuka Shell, Inc.) by 45 weight % and electrically conductive carbon by 50 weight %. This coating material was uniformly applied all over the surface of a stainless steel plate of area 70 cm$^2$ to form the negative electrode 2 with the polyaniline-containing layer 1. Next, an aqueous solution containing table salt 0.1 and weight % agar by 0.15 weight % was prepared and after it was made into a gel, it was cut into thickness of 2 mm to form the partition membrane 3. A titanium plate covered with a thin layer of platinum was further prepared to be used as the positive electrode 4. The negative and positive electrodes 2 and 4 were stacked one above the other with the partition membrane 3 in between, as shown in FIG. 2B, and were connected to a voltage source.

Twenty of these devices were prepared and arranged in parallel and indoor air was caused to pass thereon at a flow rate of 1.5 L/min for 24 hours while applying a voltage of 2V to each of them intermittently at intervals of one second. Agar incubation tests were carried out similarly as described for Experiment No. 8 but no growth of colony was observed.

Experiment No. 10

A device as prepared in Experiment No. 9 was placed inside a glass container with internal volume of 700 mL and a silver bar (not shown) with silver chloride deposited on the surface was inserted into the ion-conducting material of the partition membrane 3 to serve as a standard calomel electrode (SCE). Next, acetaldehyde 5 μL was sealed inside the glass container and a voltage of −0.4V with respect to the SCE was applied to the negative electrode 2. The initial concentration of acetaldehyde was 750 ppm but its concentration after one day was 0 ppm.

As demonstrated by these experiments, active oxygen can be generated effectively in an oxygen-containing gas-phase environment by a method embodying this invention and the existence of light is not a requirement unlike with a prior art method using an optical catalyst. According to a method embodying this invention, furthermore, sterilization and deodorization can be effected at a low cost without using any apparatus of a special type.

What is claimed is:

1. A method of generating active oxygen in an environment which contains oxygen and is in a gas phase, said method comprising the steps of:

providing an agent containing polyaniline or derivatives of polyaniline, said polyaniline being one or more selected from the group consisting of compounds shown by Formulas (1)–(4) given below:

Formula (1)

Formula (2)

Formula (3)

Formula (4)

where A is a negative ion, x and y are positive numbers such that x+y=1 and n is a positive integer between 2 and 1000; and causing said polyaniline or derivative of polyaniline to react with said oxygen in said environment whereby active oxygen is generated.

2. The method of claim 1 wherein n is between 10 and 500.

3. The method of claim 1 wherein A is conjugate base of a protonic acid.

4. The method of claim 1 wherein A is conjugate base of a Lewis acid.

5. The method of claim 1 further comprising the step of reducing said polyaniline after said polyaniline is reacted with oxygen to generate active oxygen.

6. The method of claim 1 further comprising the step of reducing the amount of water content adsorbed to said polyaniline after said polyaniline is reacted with oxygen to generate active oxygen.

7. The method of claim 1 further comprising the step of heating and cooling said polyaniline.

8. The method of claim 1 wherein said agent further contains 5–5000 ppm of ions of transition metal or chelates thereof.

9. The method of claim 1 wherein said agent is applied to a base member selected from the group consisting of metals, resins, glass, wood materials and fibers.

10. The method of claim 1 wherein said agent is placed inside a column and an gas containing oxygen is caused to pass through said column.

11. The method of claim 1 further comprising the step of providing an air cleaner having a heat-radiating plate and covering said heat-radiating plate with said agent, said polyaniline or derivative of polyaniline being caused to react with said oxygen by causing air containing said oxygen to pass over said heat-radiating plate.

* * * * *